US007657136B2

(12) United States Patent
Matsuoka et al.

(10) Patent No.: US 7,657,136 B2
(45) Date of Patent: Feb. 2, 2010

(54) OPTOELECTRONIC INTEGRATED CIRCUIT DEVICE AND COMMUNICATIONS EQUIPMENT USING SAME

(75) Inventors: Yasunobu Matsuoka, Hachioji (JP); Masato Shishikura, Ome (JP)

(73) Assignee: Hitachi Chemical Co., Ltd., Tokyo (JP)

( * ) Notice: Subject to any disclaimer, the term of this patent is extended or adjusted under 35 U.S.C. 154(b) by 0 days.

(21) Appl. No.: 11/658,587

(22) PCT Filed: Sep. 29, 2004

(86) PCT No.: PCT/JP2004/014226

§ 371 (c)(1),
(2), (4) Date: Jan. 10, 2008

(87) PCT Pub. No.: WO2006/035499

PCT Pub. Date: Apr. 6, 2006

(65) Prior Publication Data

US 2009/0003761 A1  Jan. 1, 2009

(51) Int. Cl.
G02B 6/12 (2006.01)
(52) U.S. Cl. .............................. 385/14; 385/24; 385/83; 385/49; 385/88; 385/89; 385/129; 385/130; 385/131; 385/132
(58) Field of Classification Search .................. 385/14, 385/15, 31, 49, 88, 89, 92, 94, 129, 130, 385/131, 132, 24, 65, 83
See application file for complete search history.

(56) References Cited

U.S. PATENT DOCUMENTS 5,008,554 A * 4/1991 Asakawa et al. ............. 250/551

| 5,757,989 | A | * | 5/1998 | Yoshimura et al. ............ 385/14 |
| 6,696,755 | B2 | * | 2/2004 | Kami et al. .................. 257/728 |
| 2003/0025962 | A1 | | 2/2003 | Nishimura .................... 385/14 |
| 2003/0173663 | A1 | * | 9/2003 | Kami et al. .................. 257/728 |
| 2009/0003761 | A1 | * | 1/2009 | Matsuoka et al. ............. 385/14 |

OTHER PUBLICATIONS

International Search Report of PCT/JP2004/014226 mailed Dec. 28, 2004.
Kazuhiko Kurata et al., "Opto-Electronics Packaging Techniques for Interconnection", 2003 IEEE, pp. 364-365.

* cited by examiner

*Primary Examiner*—Brian M Healy
(74) *Attorney, Agent, or Firm*—Stites & Harbison PLLC; Juan Carlos A. Marquez, Esq.

(57) ABSTRACT

A photoelectric integrated circuit device, in which photonic devices provided on the same substrate as the LSI are densely arranged along the four sides of the LSI, and characteristic degradation of the laser diode or photo detector due to heat generation can be prevented, furthermore optical wiring is easily performed on the board. A quadrilateral package substrate 11; an LSI package 13 mounted on the package substrate 11; photonic devices 12 mounted along two or more sides of the LSI package 13; first photonic devices electrically connected to I/O terminals disposed on one side of the LSI package 13; second photonic devices electrically connected to I/O terminals disposed on a different side of the LSI package 13; first optical waveguides for connecting between the optical signal I/O terminals of the first photonic devices and an external component or device; and second optical waveguides for connecting between the optical I/O terminals of the second photonic devices and an external component or device; wherein the first and second optical waveguides are terminated on the same side edge of the package substrate 11.

17 Claims, 13 Drawing Sheets

OPTOELECTRONIC INTEGRATED CIRCUIT DEVICE AND COMMUNICATIONS EQUIPMENT USING SAME

TECHNICAL FIELD

The present invention relates to an optoelectronic integrated circuit device and a mounting configuration thereof for processing large-capacity optical signals (or high data rate optical signals) collectively transmitted and received between boards within a communications equipment. The present invention also relates to a communications equipment using such an optoelectronic integrated circuit device.

BACKGROUND ART

Recently, in the field of information and telecommunications, optical communications infrastructures have been rapidly constructed to allow large amounts of data to be exchanged at high speed using light. To date, fiber-optic networks extending a large distance (several kilometers or more) have been built, such as backbone, metro, and access networks. However, in order to further reduce the delay in the transmission of a large amount of data, it is necessary to employ fiber optics (instead of conventional metallic cables and wires) also for interconnection between devices or components spaced a very short distance apart from each other, such as between communications devices or racks (several to several hundred meters apart) and even between components within a communications equipment or a rack (several to several ten centimeters apart). The following description will be directed to use of fiber optics (or optical wiring) within communications equipment. Routers and switching devices, for example, contain line cards to receive high frequency signals sent through optical fibers over an external network such as an Ethernet network. In these devices, pluralities of such line cards are coupled to a backplane. The input signals to the line cards are transmitted to a switch card through the backplane, processed by the LSI on the switch card, and then returned to the line cards also through the backplane. It should be noted that, currently, the signal (or data) supplied from each line card to the switch card through the backplane is transmitted at a data rate of 300 Gbits/sec or higher. This means that in the case of conventional electrical wiring (using metallic wires), 100 or more wires are required to reduce the propagation loss and thereby achieve such a high data rate transmission; that is, each wire can carry only approximately 1 to 3 Gbits of data per second. Further, these high frequency lines require an equalizer, as well as some measures against reflection and crosstalk between wires. In the case of conventional electrical wiring, if communications systems increase in capacity in the future and hence require a communication equipment capable of processing information at a rate on the order of terabits/sec, the above problems of increased number of wires required for transmission and of crosstalk between the wires will become more serious. On the other hand, connecting between the line cards and the backplane and between the backplane and the switch card by fiber optics for signal transmission will allow transmission of high frequency signals at a data rate of 10 Gbps or higher with reduced loss, reducing the number of wires required for transmission and eliminating the need for the above measures against reflection and crosstalk between the wires. To achieve this, optoelectronic integrated circuit devices are being developed. These optoelectronic integrated circuit devices can be used in a switch card and contain an LSI package having photonic devices mounted therein. The switch card processes high data rate signals collectively received from the above line cards.

Such an optoelectronic integrated circuit device is reported, for example, in "Opto-Electronics Packaging Techniques for Interconnection," LEOS2003 (Lasers and Electro-Optics Society), volume 1, p. 26-30, Oct., 2003 (Nonpatent Document 1). FIG. 16 shows this optoelectronic integrated circuit device. Referring to the figure, an LSI 162 and photonic devices 12 are mounted on a package substrate 11 having a bump array 18. The LSI 162 is located at the center portion of the substrate 11, and the photonic devices 12 are disposed along the four sides of the LSI 162. Fiber connectors 15 are directly connected to these photonic devices 12 to achieve an optical coupling. Thus, the optical interconnection paths (or optical wiring) extend close to the LSI 162, which allows high frequency electrical lines 24 connected between the I/O terminals of the LSI 162 and the photonic devices 12 to have a relatively small length, resulting in a reduction in the propagation loss (or transmission loss) of the high frequency signals. This configuration also allows the integration density of the package to be enhanced, since the photonic devices 12 are disposed on the same package substrate 11 as the LSI 162 such that they are located along the four sides of the LSI 162 as described above.

Nonpatent Document 1: "Opto-Electronics Packaging Techniques for Interconnection," LEOS2003.(Lasers and Electro-Optics Society), volume 1, p. 26-30, Oct., 2003

DISCLOSURE OF THE INVENTION

Problems to be Solved by the Invention

However, since in the above optoelectronic integrated circuit device the fiber connectors 15 are directly connected to the photonic devices 12, the size of the fiber connectors 15 is a limiting factor in reducing the size of the photonic devices 12, meaning that there is a limit to the maximum number of photonic devices 12 that can be connected to the I/O terminals of the LSI 162. Further, each photonic device 12 includes a laser diode or a photodetector and driver ICs, and the characteristics of this diode or photodetector vary considerably with temperature. Providing the module with radiating fins may be effective in cooling the module (and hence the photonic devices 12). However, with the above optoelectronic integrated circuit device structure, such an arrangement is difficult to achieve, since the optical connectors 15 are disposed right above their respective photonic devices 12 and connected to them. Therefore, the heat of the diode (or photodetector) itself or the heat generated by the IC might affect and hence degrade the characteristics of the diode (or photodetector).

Further, in the above optoelectronic integrated circuit device, fibers 16 connected to the photonic devices disposed along the four sides of the LSI 162 are connected to the optical connector on the backplane side. These fibers must be routed over the board such that they have a large bending radius to maintain sufficient strength and prevent an increase in the optical excess loss. However, it is difficult to achieve such routing. Furthermore, if a plurality of such packages are mounted on a board, the routing of optical interconnection paths over the board is further complicated.

The core of each fiber may be directly embedded in the package substrate and the optical connectors may be disposed at different locations than the photonic devices in order to remove the above restriction on the maximum number of connectable photonic devices (due to the optical connectors being directly connected to the photonic devices) and in order to circumvent the above problem of difficulty in heat dissipation. However, such a method is disadvantageous in that the adhesive usually used to fix the fiber cores to the package substrate might not be able to withstand the reflow heat (higher than 250° C.) used when the package substrate is mounted on the board, resulting in softening, peeling, etc. To prevent this, the fabrication process may be changed such that after mounting the package substrate on the board, the fibers are fixed to the substrate and the photonic devices are mounted on the substrate. However, this is not practical, since it is very difficult to form the optical coupling portion that requires high accuracy, after mounting the package substrate on the board.

On the other hand, forming high heat resistance optical waveguides in the package substrate and disposing connectors on an edge of the substrate permit providing a sufficient distance between the photonic devices and the connector portions while preventing attenuation (or loss) of the high frequency signals exchanged between them. This allows for a reduction in the size of the photonic devices, as well as allowing the same radiating fins to be used for both the LSI and the photonic devices. That is, the above structure can be used to remove the above restriction on the maximum number of photonic devices connectable to the LSI and circumvent the above problem of difficulty in heat dissipation.

However, there still remain the problems of routing the optical waveguides connected to the photonic devices disposed along the four sides of the LSI on the package substrate and of routing the optical interconnection paths (or optical wiring) over the board which are connected to the backplane-side optical connector. Further, in this example, the optoelectronic integrated circuit device is assumed to be optically coupled to the backplane-side optical connector by fibers. Instead of using fibers, optical waveguides may be formed on the board to couple the optoelectronic integrated circuit device to the backplane-side optical connector. In this case, however, the package substrate must be mounted on the board in such a way that the waveguides on the board are optically coupled to those extending from the LSI to the four sides of the package substrate at once although they have different vectors. This means that if there is angular misalignment, etc. between these waveguides, they cannot be accurately or fully coupled to each other.

It is, therefore, an object of the present invention to provide an optoelectronic integrated circuit device that allows simplification of the routing of optical connection paths over the board on which the integrated circuit device is mounted, and that has a configuration in which: the photonic devices provided on the same substrate as the LSI are densely arranged along the four sides of the LSI; and the heat generated within the optoelectronic integrated circuit device does not affect (and hence does not degrade) the characteristics of the laser diode or photodetector of each photonic device. Another object of the present invention is to provide a communications device using such an optoelectronic integrated circuit device.

Means for Solving the Problems

To solve the above problems, the present invention provides an optoelectronic integrated circuit device, as shown in FIG. 1, comprising: a quadrilateral package substrate 11; an LSI package 13 mounted on the package substrate 11; photonic devices 12 mounted along two or more sides of the LSI package 13; first photonic devices electrically connected to I/O terminals disposed on one side of the LSI package 13; second photonic devices electrically connected to I/O terminals disposed on a different side of the LSI package 13; first optical waveguides for connecting between the optical signal input/output terminals of the first photonic devices and an external component or device; and second optical waveguides for connecting between the optical input/output terminals of the second photonic devices and an external component or device; wherein the first and second optical waveguides are terminated on the same side edge of the package substrate 11. Thus, optical waveguides are formed in the package substrate 11 as optical paths, and the optical waveguides 14 for connecting between the optical signal input/output terminals of the photonic devices and an external component or device are terminated on the same side edge 19 of the substrate. The above arrangement permits providing a sufficient distance between the photonic devices 12 and the fiber connector portions 15 while preventing attenuation (or loss) of the high frequency signals exchanged between them as described above. This allows for a reduction in the size of the photonic devices 12, as well as allowing the same radiating fins to be used for both the LSI package 13 and the photonic devices 12. That is, it is possible to remove the above-mentioned restriction on the maximum number of photonic devices connectable to the LSI package and to circumvent the above-mentioned problem of difficulty in heat dissipation.

Further, since the first and second optical waveguides are terminated on the same side edge of the package substrate 11, fibers 16 can be linearly extended from the optical connectors 15 on an edge portion of the substrate 11 to an optical connector 112 on an edge of the board 111, as shown in FIG. 11, thus simplifying the routing of optical interconnection paths over the board 111. Further, in the case where optical waveguides 22 are formed on the board 111 (as shown in FIG. 12), these optical waveguides and the optical waveguides 14 which extend from the four sides of the package substrate can be optically coupled to each other on one side (vector) of the substrate (since they extend in the same direction), resulting in an accurate optical coupling without any angular misalignment.

Further, since the optical I/O (terminals) of the substrate for connection with an external component or device is disposed along only one side edge of the substrate, peripheral chips such as memory packages 114 can be disposed near the other three side edges of the substrate and connected (to the LSI package) through electrical lines 113. This configuration permits a denser arrangement of packages on the board 111.

Another aspect of the present invention provides an optoelectronic integrated circuit device, as shown in FIG. 10, comprising: a quadrilateral package substrate 11; an LSI package 13 mounted on the package substrate 11; photonic devices 12 mounted along two or more sides of the LSI package 13; first photonic devices electrically connected to I/O terminals disposed on one side of the LSI package 13; second photonic devices electrically connected to I/O terminals disposed on a different side of the LSI package 13; first optical waveguides for connecting between the optical signal input/output terminals of the first photonic devices and an external component or device; and second optical waveguides for connecting between the optical input/output terminals of the second photonic devices and an external component or device; wherein the first optical waveguides are terminated on one of the four side edges of the package substrate 11, and the second optical waveguides are terminated on one of the other side edges of the package substrate 11.

According to yet another aspect of the present invention, the first optical waveguides 14 are terminated on one of the four side edges of the substrate 11, and the second optical waveguides 22 are terminated on an adjacent one of the other side edges of the substrate 11, as shown in FIG. 8. When two optoelectronic integrated circuit devices such as that shown in FIG. 8 are mounted on a board, these integrated circuit devices can be optically coupled to each other by a straight optical interconnection path extending across one of the four side edges of each device, and further optically connected to the optical connector on the backplane-side edge of the board by a straight optical interconnection path extending across another one of the four side edges of each device.

According to still another aspect of the present invention, the first optical waveguides 14 are terminated on one of the four side edges of the substrate 11, and the second optical waveguides 22 are terminated on another one of the four side edge of the substrate facing the above one of the four side edges across the substrate center, as shown in FIG. 10. This configuration permits the above effects of the present invention to be achieved when the optical signals input or output through the front portion (an Ethernet adapter, etc.) of the board are processed by the optoelectronic integrated circuit devices and then input to or output from the backplane.

According to still another aspect of the present invention, the first optical waveguides 14 and the second optical waveguides 22 (linearly extend and) intersect each other on the substrate 11, as shown in FIG. 8. The above effects of the present invention can be achieved even when the first optical waveguides 14 and the second optical waveguides 22 are bent so that they do not intersect each other, as shown in FIGS. 7 and 9. However, forming (intersecting) straight optical waveguides on the substrate as shown in FIG. 8 is more advantageous, since bending an optical waveguide results in radiation loss. Furthermore, this permits a reduction in the space required for the optical interconnection paths (that is, these optical waveguides) and hence a reduction in the area of the substrate of the integrated circuit device. It should be noted that optical interconnection paths (i.e., optical waveguides) are believed to suffer substantially no interference from each other even when they intersect each other, whereas electrical wires may suffer a short circuit when they intersect each other.

According to a further aspect of the present invention, the LSI package 13 and the photonic devices 12 electrically connected to the I/O terminals of the LSI package 13 form an angle with a side edge 19 of the package substrate, that is, they are non-parallel to the side edge 19, as shown in FIG. 1. This arrangement allows a reduction in the bending radius of the optical waveguides 14 and hence a reduction in the optical radiation loss from the bent portions, as compared to when the LSI package 13 and the photonic devices 12 are positioned parallel to edges of the substrate, as shown in FIG. 4.

According to a still further aspect of the present invention, the first and second optical waveguides together form a single layer or form two separate layers in the thickness direction of the substrate, as shown in FIGS. 6 and 7, respectively.

According to another aspect of the present invention, the substrate 11 is provided with a ball grid array 18 or a pin grid array for electrical connection with the board, as shown in FIG. 1.

According to yet another aspect of the present invention, the photonic devices 12 each include at least one driver IC 28 and at least one surface-emitting laser diode 27, as shown in FIG. 2.

According to still another aspect of the present invention, the photonic devices each include at least one signal amplifier IC 26 and at least one surface-illuminated photodetector 25, as shown in FIG. 2.

According to another aspect of the present invention, the terminal portions of the optical waveguides 14 disposed on the edge 19 of the substrate are optically coupled to an external component or device through optical fiber connectors 15, as shown in FIG. 1.

Yet another aspect of the present invention provides a communications device that includes boards, optoelectronic integrated circuit devices 151 (mounted on the boards), and optical interconnection paths 152 for delivering high frequency signals between the boards by use of the integrated circuit devices 151.

EFFECTS OF THE INVENTION

Thus, the present invention can provide an optoelectronic integrated circuit device that allows simplification of the routing of optical interconnection paths over the board on which the integrated circuit device is mounted, and that has a configuration in which: the photonic devices provided on the same substrate as the LSI are densely arranged along the four sides of the LSI; and the heat generated within the optoelectronic integrated circuit device does not affect (and hence does not degrade) the characteristics of the laser diode or photodetector of each photonic device. The present invention can also provide a communications device using such an optoelectronic integrated circuit device.

BEST MODE FOR CARRYING OUT THE INVENTION

Preferred embodiments of the present invention will be described with reference to the accompanying drawings.

First Embodiment

FIG. 1 is a top view of an optoelectronic integrated circuit device according to a first embodiment of the present invention. In this optoelectronic integrated circuit device, the optical I/O portions of optical waveguides 14 formed on a package substrate 11 are terminated on the same side edge 19 of the substrate 11. FIG. 2 is a cross-sectional view of an optoelectronic integrated circuit device of the first embodiment. As shown in FIG. 2, optical waveguides 22 are formed in a package substrate 21 so as to form two layers. The optical I/O portions of the optical waveguides 22 are terminated on the same side edge of the package substrate. Each optical I/O portion includes a groove 17 in which an optical connector 15 is mounted. Optical fibers (from an external component or device) are optically coupled to their respective optical waveguides 22 through these optical connectors 15. Further, a mirror portion 29 is formed at the other end of each optical waveguide 22, and the light propagated within each optical waveguide 22 is returned by the mirror portion 29 and then coupled to a surface-illuminated photodetector 25 or a surface-emitting laser diode 27 of a respective photonic device 12 flip-chip bonded to the substrate. Further, an LSI package 13 mounted on the substrate is electrically connected to the photonic devices 12 through electrical lines 24 formed on a high frequency electrical wiring layer 23.

There will now be briefly described an exemplary method for manufacturing this optoelectronic integrated circuit device with reference to FIG. 3 (which includes FIGS. 3A to 3E). First, as shown in FIG. 3A, optical waveguides 14 made of a polymer or silica are formed on a surface 32 of a laminated substrate (1) 31 by a combination of processes such as coating or bonding (attaching), etching, and patterning. It should be noted that these waveguides 14 (directly) intersect each other on the same layer. Then, as shown in FIG. 3B, substrate groove portions 35 are formed in a back surface 34 of a laminated substrate (2) 33 by etching or cutting, etc., and illumination apertures 36 are formed at locations indicated in the figure. It should be noted that the depth of the substrate groove portions 35 is larger than the thickness of the optical waveguides 14 shown in FIG. 3A. It should be further noted that the illumination apertures 36 may be formed so as to penetrate through the substrate. Further, these apertures may or may not be filled with a resin transparent to the wavelength of the light used. Then, as shown in FIG. 3C, optical waveguides 22 are formed on a surface 37 of a laminated substrate (2) 33 in the same manner as described with reference to FIG. 3A. After that, the back surface 34 of the laminated substrate (2) 33 is aligned with and bonded to the surface 32 of the above laminated substrate (1) 31 using alignment marks, etc. Then, as shown in FIG. 3D, substrate groove portions 301 and illumination apertures 302 are formed in a back surface 39 of a laminated substrate (3) 38 in the same manner as described above. At that time, a high frequency electrical line pattern is formed on a surface 303 of the substrate (3). Then, the back surface 39 of the laminated substrate (3) 38 is aligned with and bonded to the surface 37 of the laminated substrate (2) 33 that has been boned to the laminated substrate (1) 31, using alignment marks, etc. in the same manner as described above. Then, as shown in FIG. 3E, connector mounting grooves are formed in the edge portions of the laminated substrates (1) to (3) by cutting etc., and the laminated substrates (1) to (3) are bonded (or attached) to a base substrate 304, thereby completing formation of the package substrate. It should be noted that an LSI package 13 and photonic devices 12 are flip-chip bonded to the high frequency electrical line pattern on the surface 303 of the laminated substrate (3) 38, which is the topmost layer of the package substrate, thereby completing formation of the optoelectronic integrated circuit device. There will now be briefly described the electrical connection between the electrical I/O of the LSI package 13 or the photonic devices 12 and a bump array 18 (i.e., electrical I/O) of the package substrate. This has not been described above. Actually, the top and back surfaces of the laminated substrates (1) to (3) have an electrical wiring pattern thereon, and the layers in the package substrate are electrically connected to one another through via holes. These wiring patterns (between the layers) may be fanned out so as to avoid the optical waveguides 14, and the electrical vias may penetrate portions of the optical waveguides 14 other than the core portions (namely, the cladding portions, etc.).

Further, although in the example shown in FIG. 1 the LSI package 13 and the photonic devices 12 form an angle with the side edge 19 of the package substrate 11, that is, they are non-parallel to the side edge 19, they may be positioned parallel to the edge 19 of the substrate 11, as shown in FIG. 4, with the same effect. However, in order to reduce the radiation loss from bent portions 40 of the optical waveguides 14, the LSI package 13 and the photonic devices 12 are preferably non-parallel to the side edge 19 of the package substrate 11, since this reduces the bending radius or angle of the optical waveguides 14.

Further, although in the example shown in FIG. 3 the optical waveguides 14 intersect each other on the substrate, they may not intersect each other, as shown in FIG. 5. This can still achieve the effects of the present invention. However, forming intersecting optical waveguides on the substrate, as shown in FIG. 3, is more advantageous since it reduces the radiation loss from the bent portions of the optical waveguides and reduces the space required for optical interconnection paths, resulting in a reduction in the area of the substrate of the integrated circuit device.

Further, in the example shown in FIG. 3, the optical waveguides 14 are formed on the laminated substrate (1) 31 so as to form two layers, and the optical waveguides 22 are formed on the laminated substrate (2) 33 so as to also form two layers. The optical waveguides 22 on the laminated substrate (2) 33 intersect each other on the same layer. On the other hand, referring to FIG. 6, the optical waveguides extending to photonic device mounting positions A 61 and extending to photonic device mounting positions B 62 may be alternately disposed on the same single-layer substrate. The photonic device mounting positions A 61 are closer to an optical input/output side edge 60 of the substrate than the photonic device mounting positions B 62. In this case, the optical waveguides extending to the photonic device mounting positions A 61 have a different (or smaller) length than the optical waveguides extending to the photonic device mounting positions B 62. Further, as shown in FIG. 7, the optical waveguides 14 may be formed on one laminated substrate (1) 31 so as to form two layers without intersecting each other, and the optical waveguides 22 may be formed on another laminated substrate (2) 33 so as to also form two layers without intersecting each other. This also produces the effects of the present invention.

Second Embodiment

FIG. 8 is a top view of an optoelectronic integrated circuit device according to a second embodiment of the present invention. In this optoelectronic integrated circuit device, the optical I/O portions of some optical waveguides (first optical waveguides) formed on a package substrate 11 are terminated on one of the four side edges of the package substrate 11, and those of the other optical waveguides (second optical waveguides) formed on the package substrate 11 are terminated on an adjacent one of the other side edges of the package substrate 11. More specifically, as shown in FIG. 8, first optical waveguides 14 formed on the package substrate 11 and extending from the optical signal input/output terminals of first photonic devices are terminated at fiber connectors 15 on an optical input/output edge portion 80 of the substrate on the backplane side. Second optical waveguides 22 extending from the optical signal input/output terminals of second photonic devices, on the other hand, are terminated at an optical input/output edge portion 81 of the substrate adjacent to the above optical input/output edge portion 80. This optical coupling method is advantageous when two optoelectronic integrated circuit devices are mounted on a single board.

Further, although in the example shown in FIG. 8 the optical waveguides 14 and 22 intersect each other on an LSI mounting portion 50 of the package substrate 11, they may be formed so as not to intersect each other, as shown in FIG. 9. This also achieves the effects of the present invention.

Third Embodiment

FIG. 10 is a top view of an optoelectronic integrated circuit device according to a third embodiment of the present invention. In this optoelectronic integrated circuit device, the optical I/O portions of some optical waveguides (first optical waveguides) formed on a package substrate 11 are terminated on one of the four side edges of the package substrate 11, and those of the other optical waveguides (second optical waveguides) are terminated on another one of the side edges of the package substrate 11 facing the above side edge across the substrate center. More specifically, as shown in FIG. 10, first optical waveguides 14 formed on the package substrate 11 and extending from the optical signal input/output terminals of first photonic devices are terminated at fiber connectors 15 on an optical input/output edge portion 80 of the substrate on the backplane side. Second optical waveguides 22 extending from the optical signal input/output terminals of second photonic devices, on the other hand, are terminated at fiber connectors 18 on an optical input/output edge portion 81 of the substrate facing the optical input/output edge portion 80 across the substrate center. This configuration is advantageous when the optical signals input or output through the front portion (an Ethernet adapter, etc.) of the board are processed by the optoelectronic integrated circuit device and then input to or output from the backplane, since it allows the optical interconnection paths to be linearly routed.

Fourth Embodiment

FIG. 11 is a top view of a board (or daughterboard) with an optoelectronic integrated circuit device, such as that shown in FIG. 1, mounted thereon and optically coupled thereto according to a fourth embodiment of the present invention. Specifically, as shown in FIG. 11, an optoelectronic integrated circuit device 110 such as that described with reference to FIG. 1 is mounted on a daughterboard 111, and fibers 16 extend linearly from the optical connectors 15 on an edge portion of the substrate of the integrated circuit device 110 to an optical connector 112 on an edge of the daughterboard 111, thus simplifying the routing of optical interconnection paths over the board 111. Further, peripheral chips such as memory packages 114 are disposed on the board 111 such that they are connected to the board 111 through electrical lines 113 and located along the three sides of the substrate of the integrated circuit device 110 on which the optical I/O portion (for external connection) of the device 110 is not located. This configuration permits a denser arrangement of packages on the board 111 as described above.

Fifth Embodiment

FIG. 12 is a top view of a board (or daughterboard) with an optoelectronic integrated circuit device mounted thereon according to a fifth embodiment of the present invention, wherein the optical waveguides in the integrated circuit device are optically coupled to those on the daughterboard. Specifically, as shown in FIG. 12, an optoelectronic integrated circuit device 110 is mounted on a daughterboard 111. Further, optical waveguides 14 extend linearly (from photonic devices) to a side edge of the substrate of the integrated circuit device 110, and optical waveguides 22 formed on the daughterboard 111 also extend linearly to an optical connector 112 on an edge of the daughterboard 111. This arrangement allows these optical waveguides 14 and 22 to be optically coupled to each other on one side (vector) of the substrate (since they extend in the same direction), resulting in an accurate optical coupling without any angular misalignment.

Sixth Embodiment

FIG. 13 is a top view of a board (or daughterboard) having mounted thereon optoelectronic integrated circuit devices such as that shown in FIG. 8 according to a sixth embodiment of the present invention, wherein between the integrated circuit devices and between integrated circuit devices and an edge of the daughterboard are optically coupled to one another. Specifically, as shown in FIG. 13, an optoelectronic integrated circuit device 110 and another optoelectronic integrated circuit device 130 are mounted on a daughterboard 111, and optical waveguides 14 on an edge portion of the substrate of the integrated circuit device 110 are optically coupled to optical waveguides 22 on an edge portion of the substrate of the integrated circuit device 130 by optical waveguides 131 formed on the daughterboard 111. Further, optical connectors 15 on another edge portion of the substrate of each integrated circuit device are coupled to an optical connector 112 on an edge of the daughterboard 111 by linearly extending fibers 16. This arrangement allows a board with two optoelectronic integrated circuit devices thereon to achieve the effects described in connection with the first and fifth embodiments.

Seventh Embodiment

FIG. 14 is a top view of a board (or daughterboard) with an optoelectronic integrated circuit device, such as that shown in FIG. 10, mounted thereon and optically coupled thereto according to a seventh embodiment of the present invention. Specifically, as shown in FIG. 14, the optoelectronic integrated circuit device 110 described with reference to FIG. 10 is mounted on a daughterboard 111, and optical connectors 15 on an edge portion of the substrate of the integrated circuit device 110 are coupled to an optical connector 112 on an edge 144 of the daughterboard on the backplane side by linearly extending fibers 16. Likewise, optical connectors 143 on the opposing edge portion of the substrate of the integrated circuit device are coupled to an optical connector 141 on an edge 140 of the daughterboard 111 on the front side by linearly extending fibers 142. This configuration also produces the effects described in connection with the third embodiment.

Eighth Embodiment

FIG. 15 is a perspective view of an optical communications device employing optoelectronic integrated circuit devices according to an eighth embodiment of the present invention. As shown in FIG. 15, each line card 154 connected to a backplane 150 has the same configuration as the board of the seventh embodiment. An optical signal is input or output through the front portion (an Ethernet adapter, etc.) and an optical connector 141 of each board 154. On each board 154, the optical signal is processed by an optoelectronic integrated circuit device 151 and delivered to a backplane-side optical connector 112 which is optically coupled to the integrated circuit device 151. The optical signal from each line card 154 is delivered to a switch card 153 through optical interconnection paths 152 on the backplane. This switch card has the same configuration as the board of the fourth embodiment. On this board, an optoelectronic integrated circuit device 110 is optically coupled to an optical connector 112 on an edge of the board by linearly extending optical interconnection paths 152 on the board. The optical signals processed by the integrated circuit device 110 are returned to the line cards 154.

INDUSTRIAL USABILITY

Thus, the present invention can be applied to an optoelectronic integrated circuit device and a mounting configuration thereof for processing high data rate signals collectively exchanged between boards within a communications device. The present invention can also be applied to a communications device using such an optoelectronic integrated circuit device.

BRIEF DESCRIPTION OF THE DRAWINGS

FIG. 1 is a top view of an optoelectronic integrated circuit device according to a first embodiment of the present invention.

FIG. 2 is a cross-sectional view of an optoelectronic integrated circuit device according to the first embodiment of the present invention.

FIG. 3A is a diagram illustrating an exemplary method for manufacturing the optoelectronic integrated circuit device according to the first embodiment of the present invention.

FIG. 3B is another diagram illustrating the exemplary method for manufacturing the optoelectronic integrated circuit device according to the first embodiment of the present invention.

FIG. 3C is still another diagram illustrating the exemplary method for manufacturing the optoelectronic integrated circuit device according to the first embodiment of the present invention.

FIG. 3D is yet another diagram illustrating the exemplary method for manufacturing the optoelectronic integrated circuit device according to the first embodiment of the present invention.

FIG. 3E is still another diagram illustrating the exemplary method for manufacturing the optoelectronic integrated circuit device according to the first embodiment of the present invention.

FIG. 4 is a top view of an optoelectronic integrated circuit device according to the first embodiment of the present invention, in which the LSI package and the photonic devices are disposed parallel to an edge of the substrate.

FIG. 5 is a top view of an optoelectronic integrated circuit device according to the first embodiment of the present invention, in which the optical waveguides do not intersect each other.

FIG. 6 is a perspective view of the structure of an optoelectronic integrated circuit device according to the first embodiment of the present invention, in which the optical waveguides are formed on the same single-layer substrate.

FIG. 7 is a perspective view of the structure of an optoelectronic integrated circuit device according to the first embodiment of the present invention, in which the optical waveguides on each substrate form two layers that do not intersect each other.

FIG. 8 is a top view of an optoelectronic integrated circuit device according to a second embodiment of the present invention.

FIG. 9 is a top view of an optoelectronic integrated circuit device according to the second embodiment of the present invention, in which the optical waveguides do not intersect each other.

FIG. 10 is a top view of an optoelectronic integrated circuit device according to a third embodiment of the present invention.

FIG. 11 is a top view of a board with an optoelectronic integrated circuit device, such as that shown in FIG. 1, mounted thereon and optically coupled thereto according to a fourth embodiment of the present invention.

FIG. 12 is a top view of a board with an optoelectronic integrated circuit device mounted thereon according to a fifth embodiment of the present invention, in which the optical waveguides in the integrated circuit device are optically coupled to those on the board.

FIG. 13 is a top view of a board having mounted thereon optoelectronic integrated circuit devices such as that shown in FIG. 8 according to a sixth embodiment of the present invention, in which the integrated circuit devices and an edge of the board are optically connected to one another.

FIG. 14 is a top view of a board with an optoelectronic integrated circuit device, such as that shown in FIG. 10, mounted thereon and optically coupled thereto according to a seventh embodiment of the present invention.

FIG. 15 is a perspective view of an optical communications device employing optoelectronic integrated circuit devices according to an eighth embodiment of the present invention.

Figure 1:
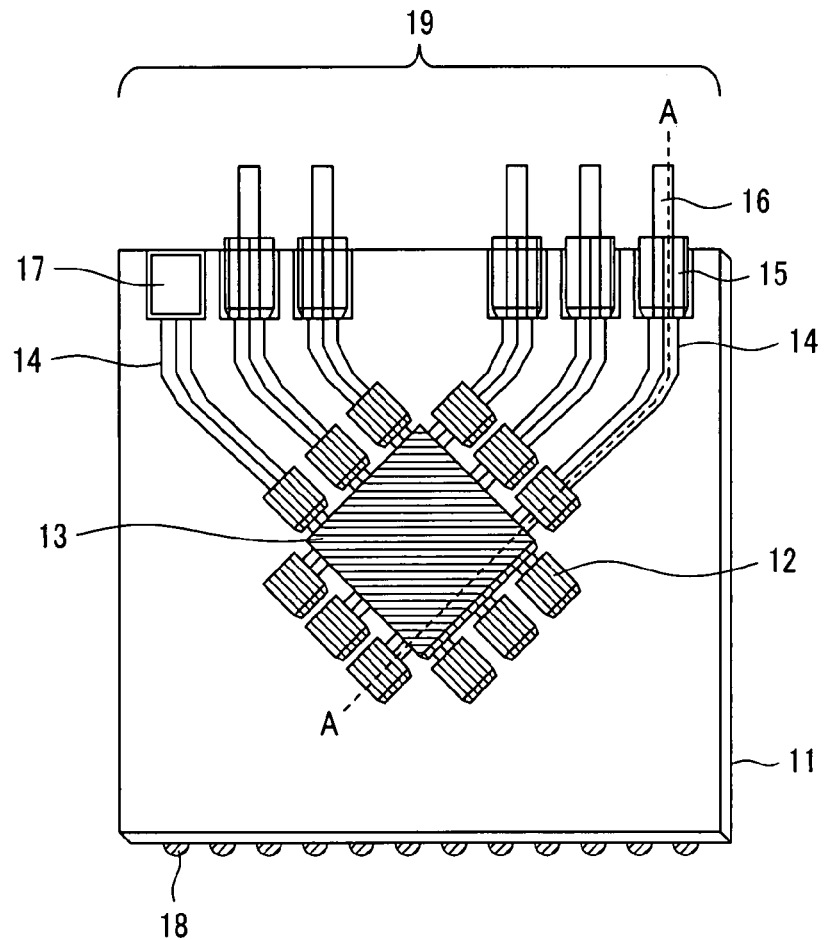
[FIG. 1]
Figure 2:
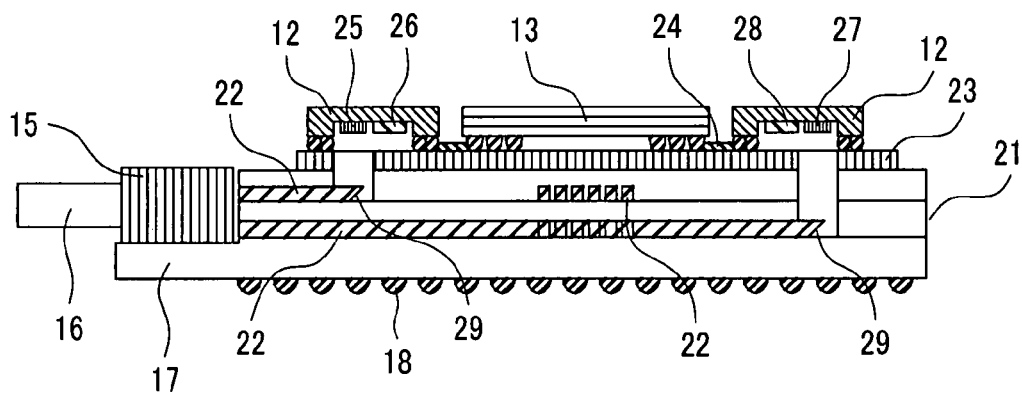
[FIG. 2.]
Figure 3A:
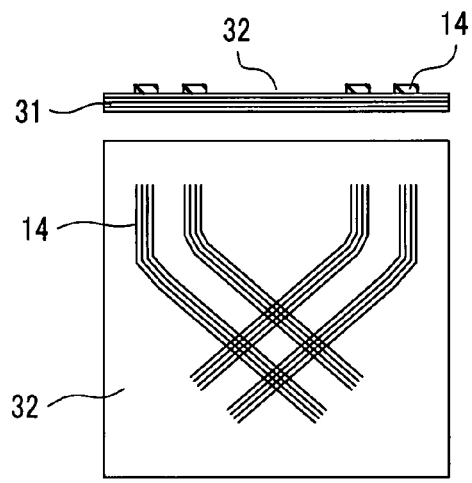
[FIG. 3A]
Figure 3B:
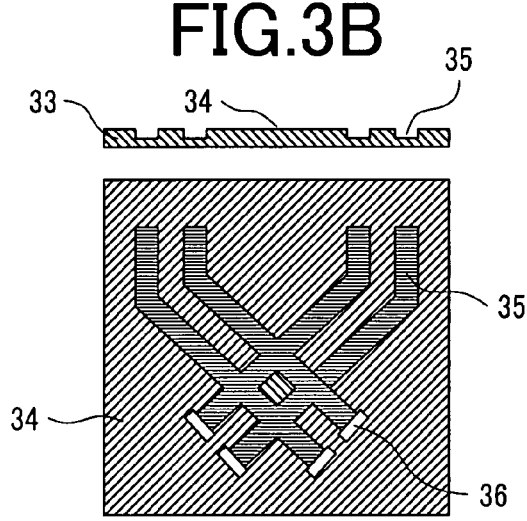
[FIG. 3B]
Figure 3C:
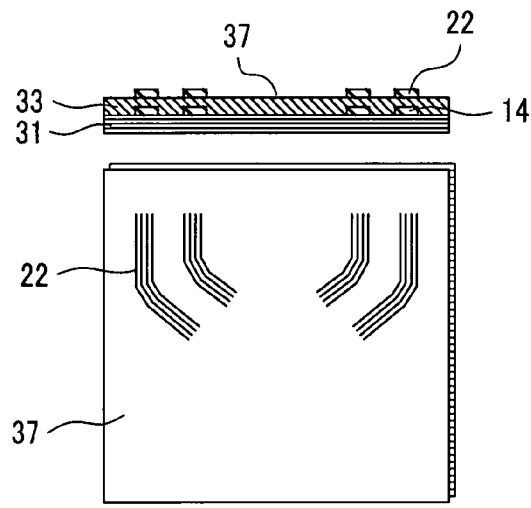
[FIG. 3C]
Figure 3D:
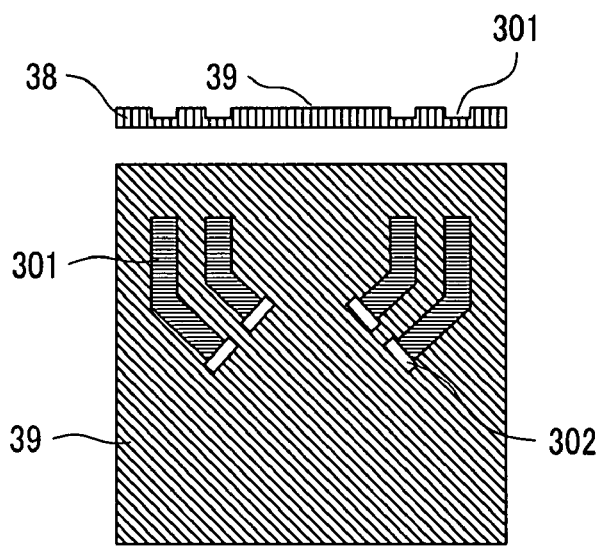
[FIG. 3D]
Figure 3E:
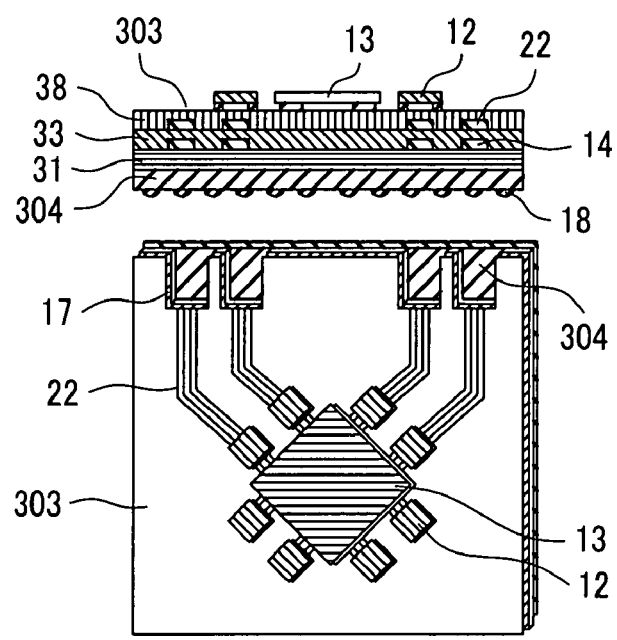
[FIG. 3E]
Figure 4:
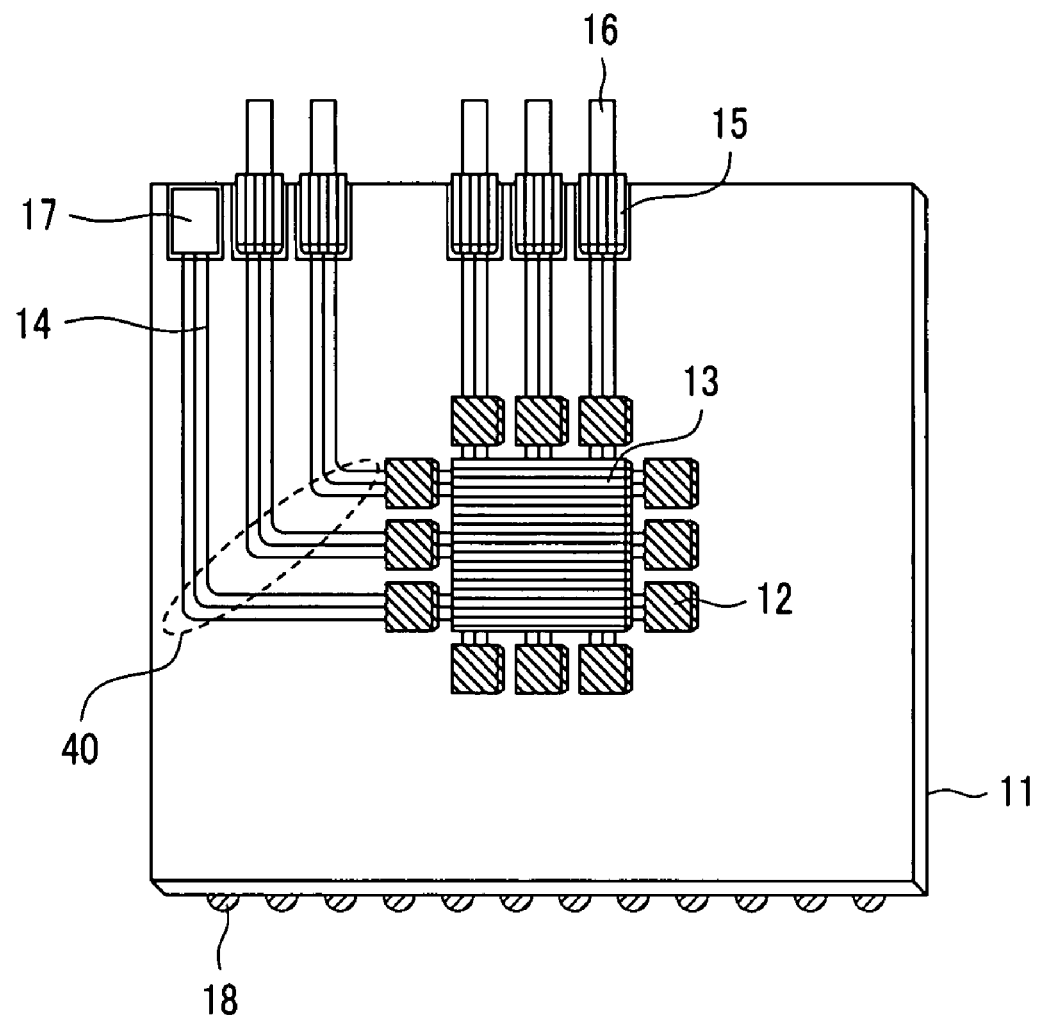
[FIG. 4]
Figure 5:
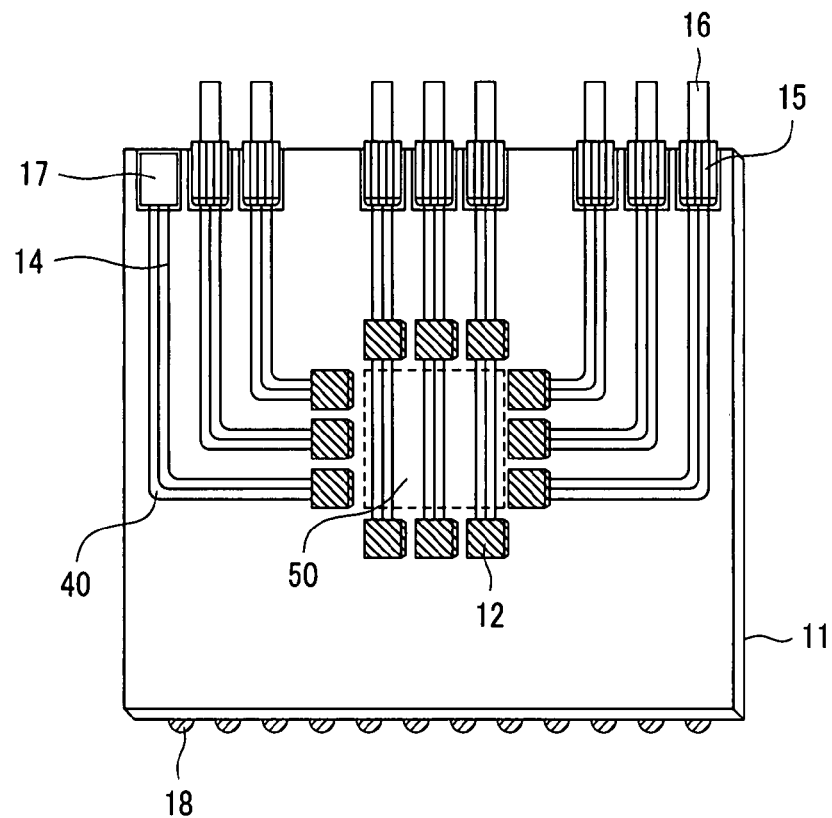
[FIG. 5]
Figure 6:
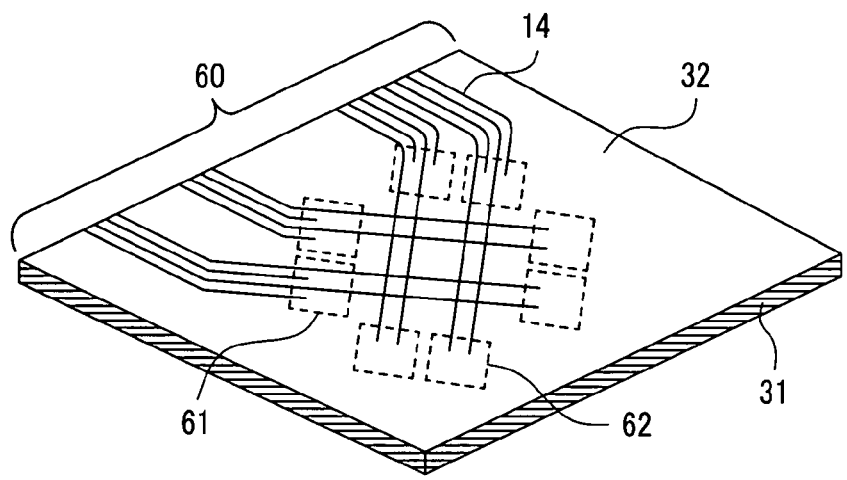
[FIG. 6]
Figure 7:
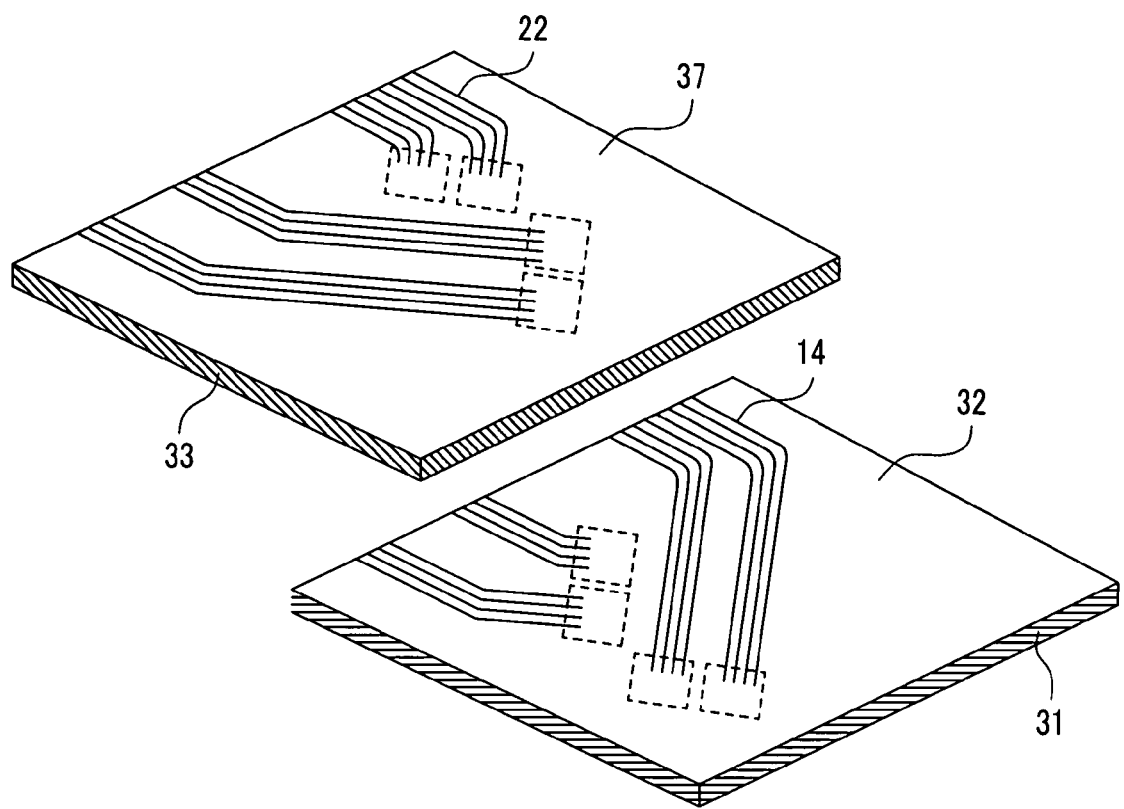
[FIG. 7]
Figure 8:
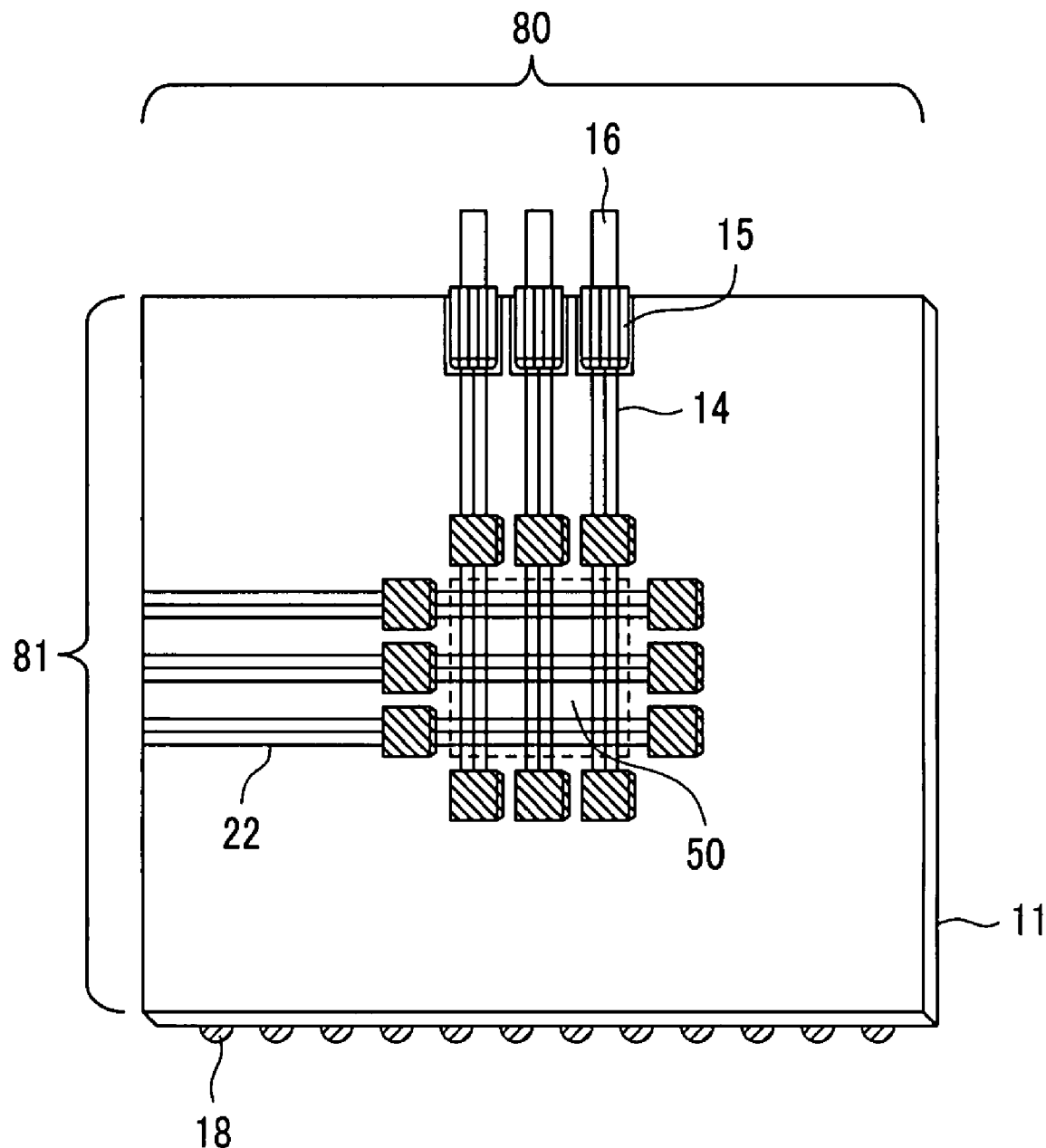
[FIG. 8]
Figure 9:
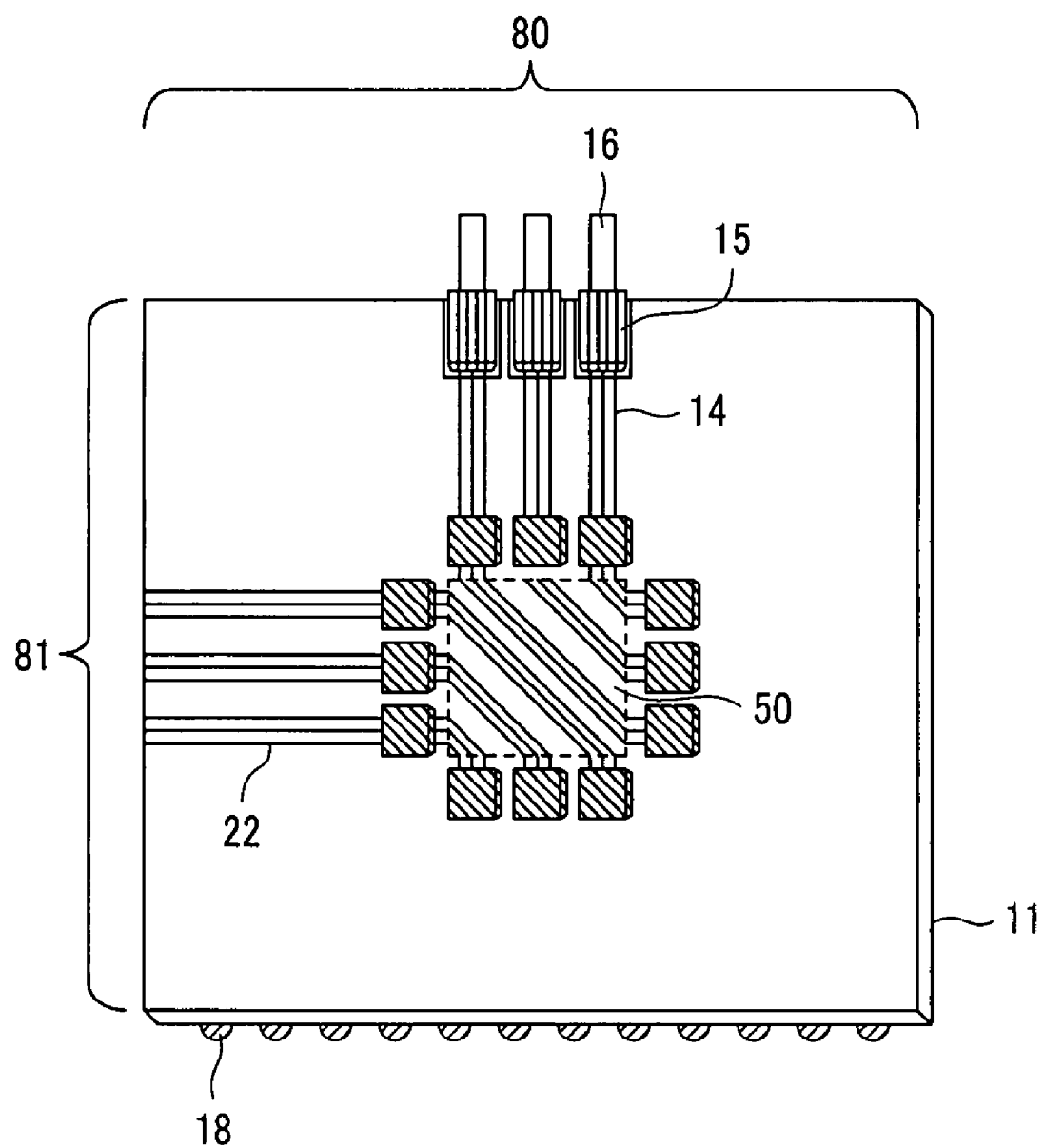
[FIG. 9]
Figure 10:
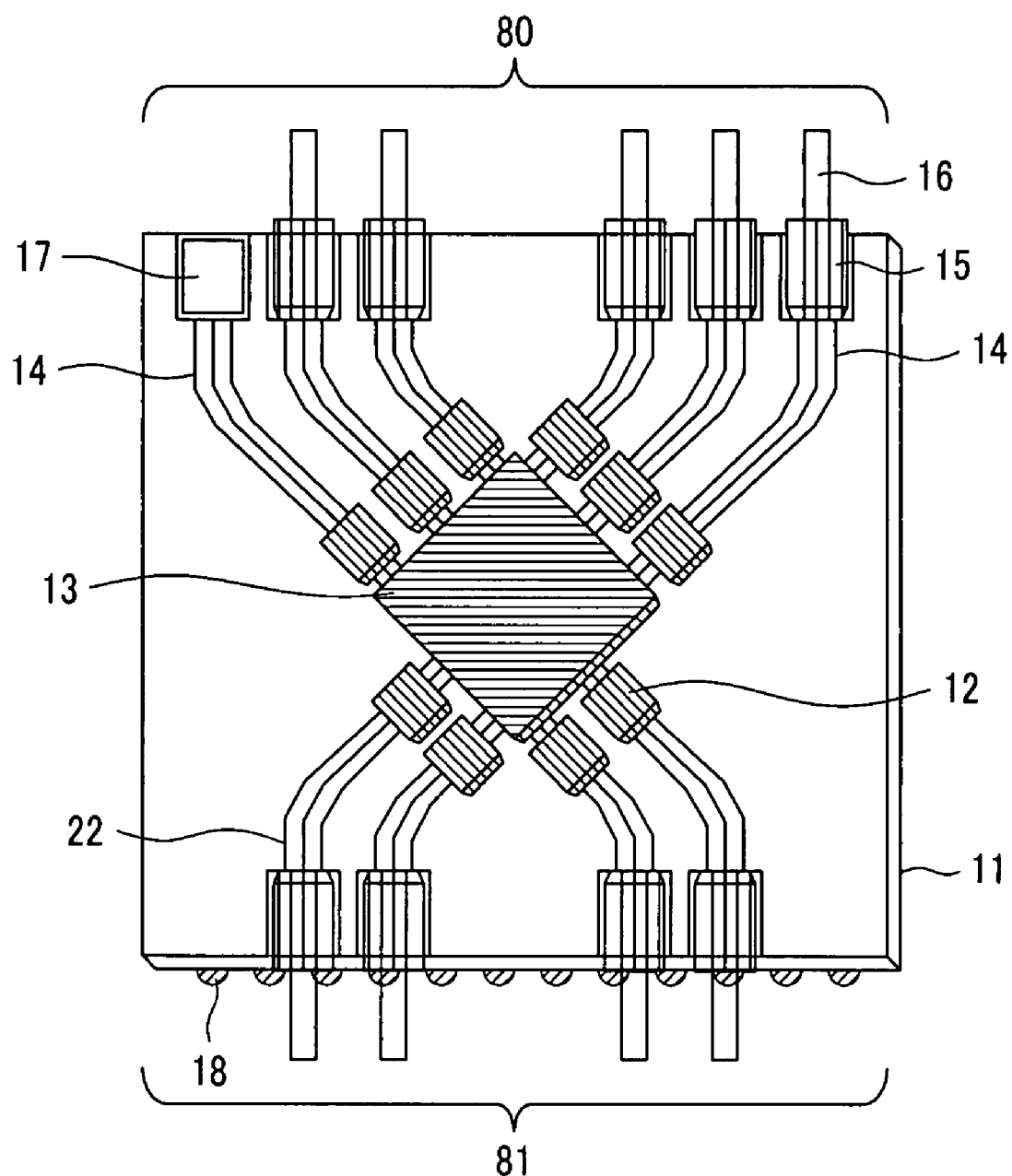
[FIG. 10]
Figure 11:
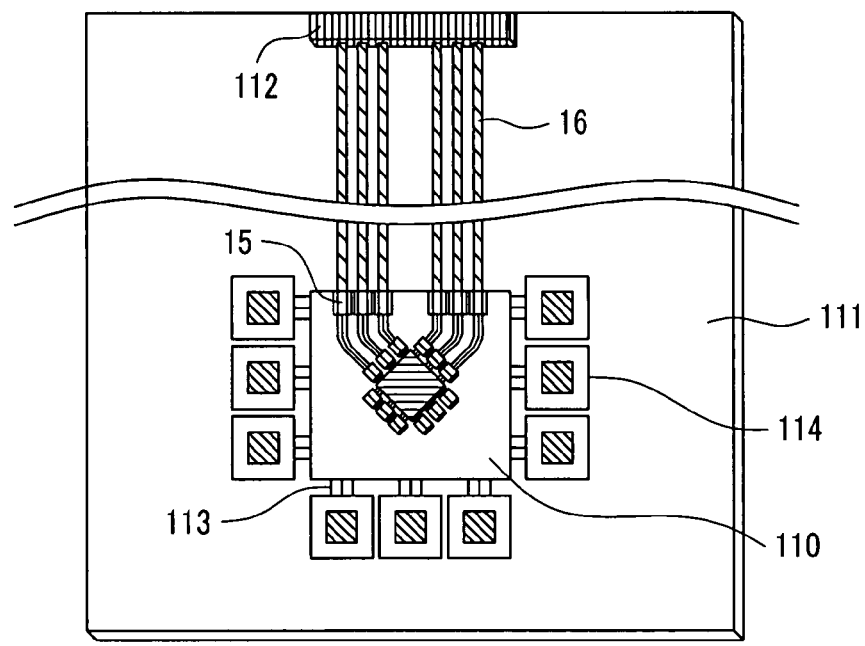
[FIG. 11]
Figure 12:
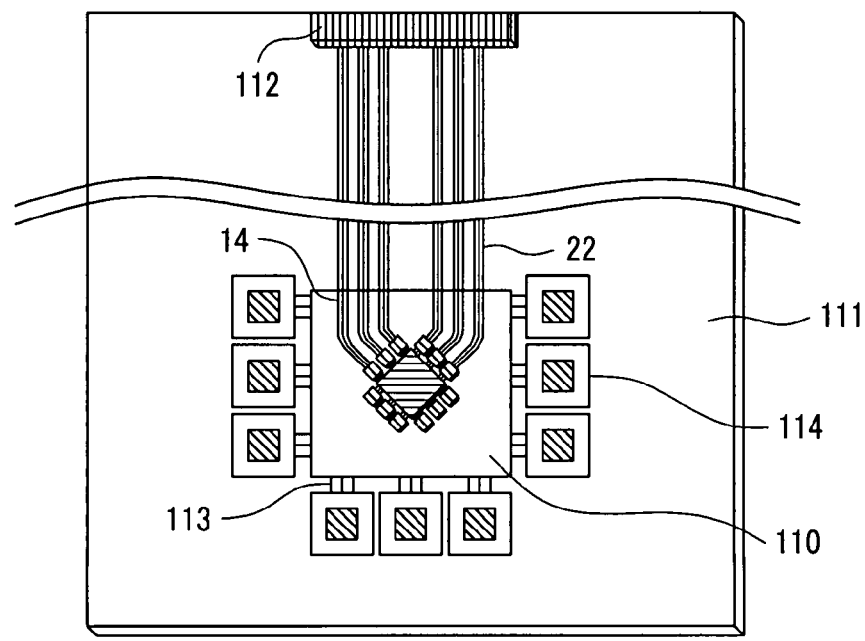
[FIG. 12]
Figure 13:
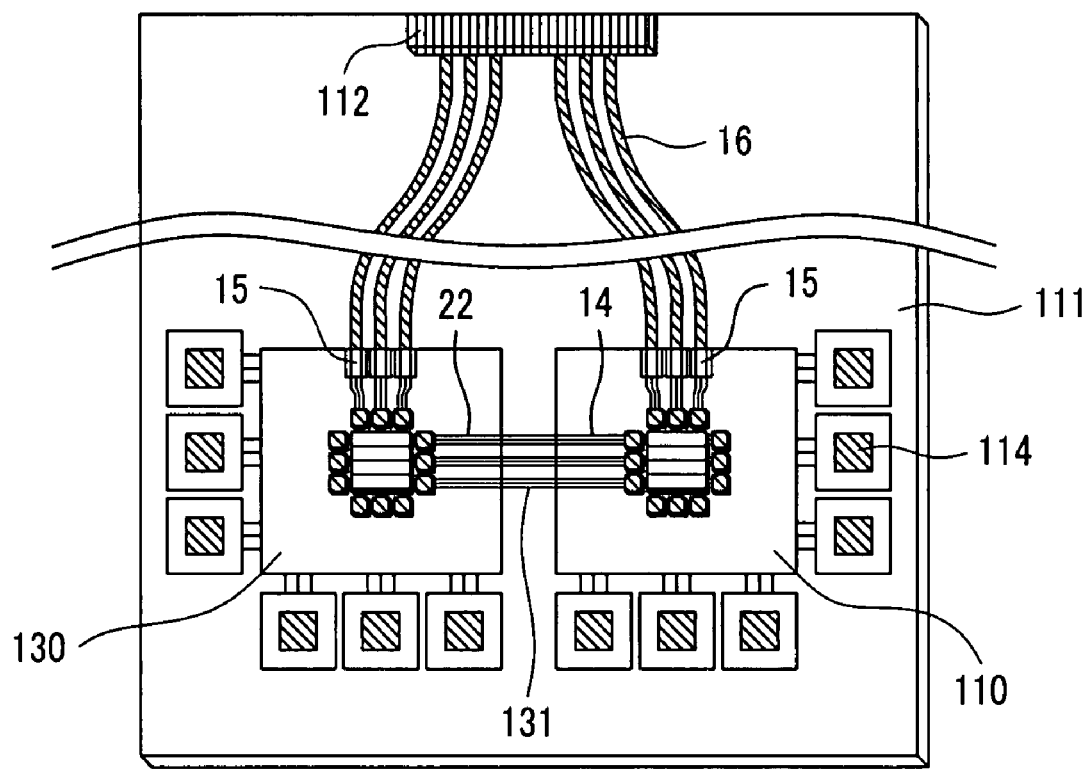
[FIG. 13]
Figure 14:
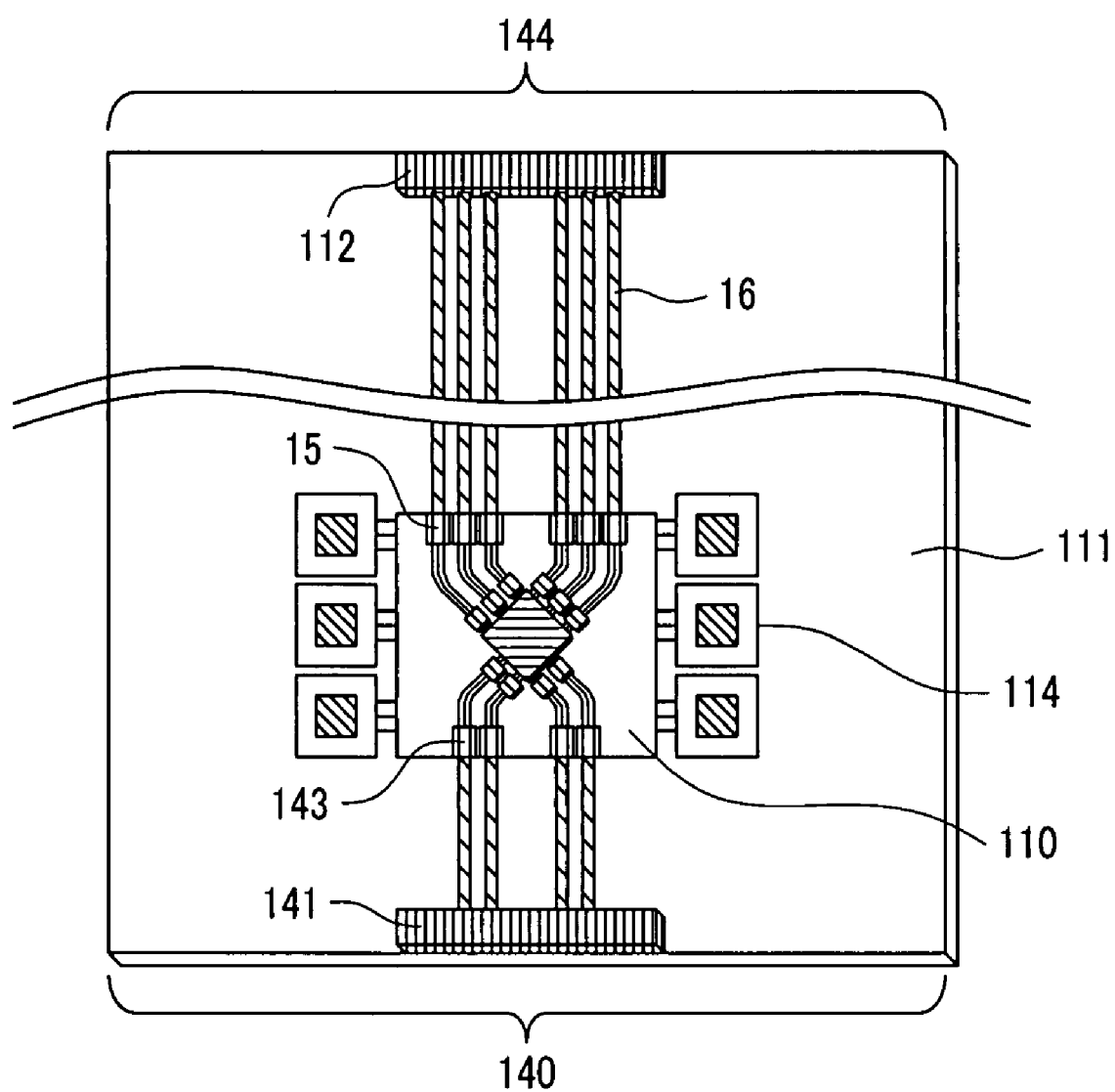
[FIG. 14]
Figure 15:
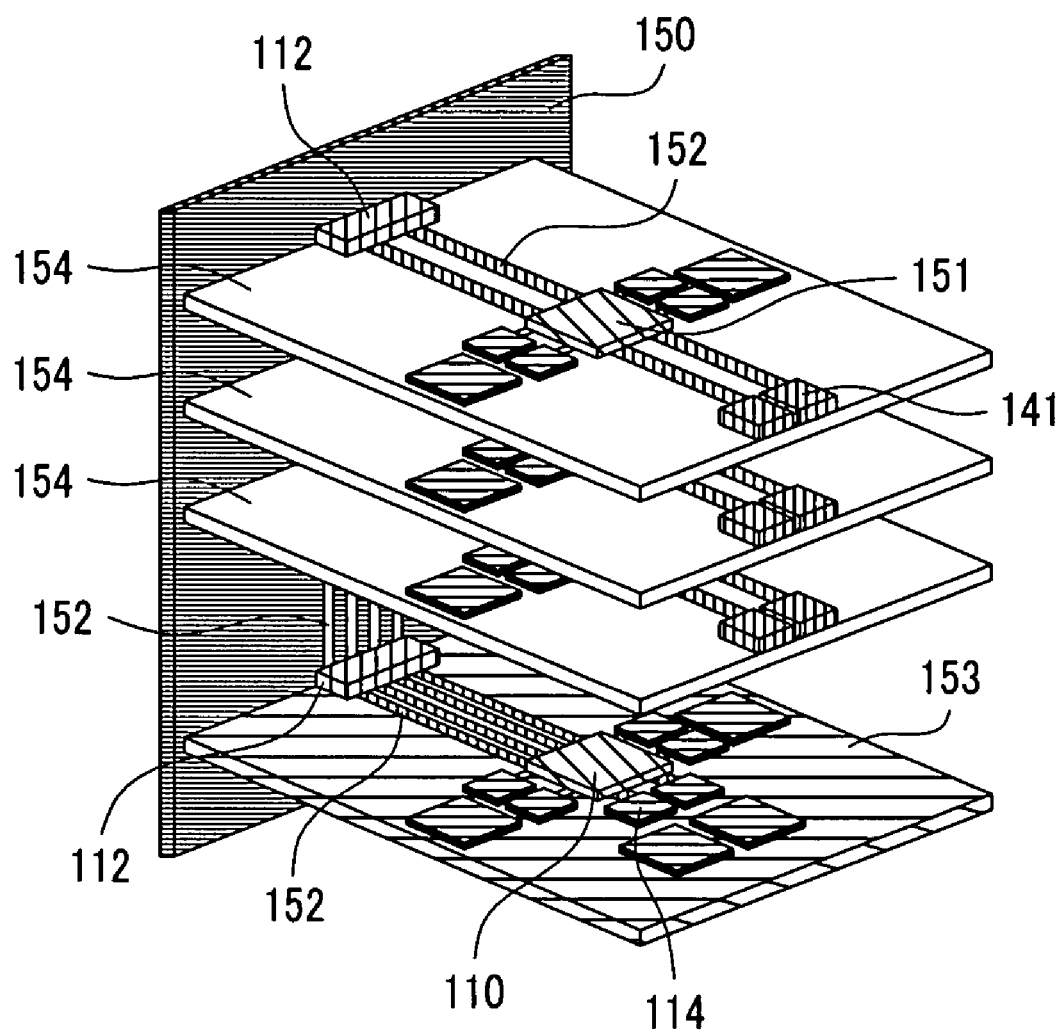
[FIG. 15]

DESCRIPTION OF REFERENCE NUMERALS 11, 21 . . . package substrate
12 . . . photonic device
13 . . . LSI package
14, 22, 131 . . . optical waveguide
15, 143 . . . fiber connector
16, 142 . . . fiber
17 . . . connector mounting groove
18 . . . bump array
19, 60, 80, 81 . . . optical input/output edge portion of substrate
23 . . . high frequency electrical wiring layer
24 . . . high frequency electrical line
25 . . . surface-illuminated photodetector
26 . . . signal amplifier IC
27 . . . surface-emitting laser diode
28 . . . driver IC
29 . . . mirror portion of optical waveguide
31 . . . laminated substrate (1)
32 . . . top surface of laminated substrate (1)
33 . . . laminated substrate (2)
34 . . . back surface of laminated substrate (2)
35, 301 . . . groove portion of substrate
36, 302 . . . illumination aperture
37 . . . top surface of laminated substrate (2)
38 . . . laminated substrate (3)
39 . . . back surface of laminated substrate (3)
303 . . . top surface of laminated substrate (3)
304 . . . base substrate
40 . . . bent portion of optical waveguide
50 . . . LSI mounting portion
61 . . . photonic device mounting position A
62 . . . photonic device mounting position B
110, 130, 151 . . . optoelectronic integrated circuit device
111 . . . daughterboard
112, 141 . . . optical connector on board edge
113 . . . electrical line
114 . . . memory package
140 . . . front-side board edge
144 . . . backplane-side board edge
150 . . . backplane
152 . . . optical wiring (or optical connection path)
153 . . . switch card
154 . . . line card
162 . . . LSI

The invention claimed is:

1. An optoelectronic integrated circuit device comprising:
   a substrate having four sides;
   an LSI package mounted on said substrate; and
   a first photonic device electrically connected to an I/O terminal disposed on one side of said LSI package;
   a second photonic device electrically connected to an I/O terminal disposed on an opposite side of said LSI package;
   a third photonic device electrically connected to an I/O terminal disposed on a side of said LSI package adjacent to said one side;
   a fourth photonic device electrically connected to an I/O terminal disposed on a side of said LSI package opposite to said adjacent side;
   a first connector mounting groove and a third connector mounting groove optically coupled to said first and third photonic devices, respectively, through optical waveguides, the first connector mounting groove and the third connector mounting groove for mounting a first connector and a second connector, respectively, to which first ends of a first optical fiber and a second optical fiber, respectively, are connected, said first optical fiber and said second optical fiber being connected at respective other ends to respective external components or devices outside said substrate;
   wherein said first and third connector mounting grooves are disposed along one side of said substrate.

2. The optoelectronic integrated circuit device as claimed in claim 1, wherein:
   said first and second photonic devices are connected by a first optical waveguide;
   said third and fourth photonic devices are connected by a second optical waveguide;
   said first and third photonic devices each include a signal amplifier integrated circuit and a surface-illuminated photodetector; and
   said second and fourth photonic devices each include a driver integrated circuit and a surface-emitting laser diode.

3. The optoelectronic integrated circuit device as claimed in claim 1, wherein:
   said second and fourth photonic devices each include a driver integrated circuit and a surface-emitting laser diode; and
   light emitted from said surface-emitting laser diode is propagated to said optical waveguides coupled to said first and third connector mounting grooves.

4. The optoelectronic integrated circuit device as claimed in claim 1, wherein said connector mounting grooves are disposed so as to meet a side edge of said substrate.

5. The optoelectronic integrated circuit device as claimed in claim 2, wherein said first and second optical waveguides are formed on the same layer within said substrate so as to extend in directions intersecting each other.

6. The optoelectronic integrated circuit device as claimed in claim 2, wherein said first and second optical waveguides are formed on different layers within said substrate so as to extend in directions intersecting each other.

7. The optoelectronic integrated circuit device as claimed in claim 1, further comprising:
   a second connector mounting groove and a fourth connector mounting groove optically coupled to said second and fourth photonic devices, respectively, through optical waveguides;
   wherein said second and fourth connector mounting grooves are disposed along a side of said substrate opposite to said one side.

8. The optoelectronic integrated circuit device as claimed in claim 7, wherein:
   said first and second photonic devices are connected by a first optical waveguide;
   said third and fourth photonic devices are connected by a second optical waveguide;
   said first and third photonic devices each include a signal amplifier integrated circuit and a surface-illuminated photodetector; and
   said second and fourth photonic devices each include a driver integrated circuit and a surface-emitting laser diode.

9. The optoelectronic integrated circuit device as claimed in claim 7, wherein said connector mounting grooves are disposed so as to meet a side edge of said substrate.

10. An optoelectronic integrated circuit device comprising:
    a substrate having four sides;
    an LSI package mounted on said substrate;
    a first photonic device electrically connected to an I/O terminal disposed on one side of said LSI package;
    a second photonic device electrically connected to an I/O terminal disposed on an opposite side of said LSI package;
    a third photonic device electrically connected to an I/O terminal disposed on a side of said LSI package adjacent to said one side;
    a fourth photonic device electrically connected to an I/O terminal disposed on a side of said LSI package opposite to said adjacent side; and
    a connector mounting groove for mounting a connector to which an optical fiber is connected, said optical fiber being connected at the other end to an external component or device outside said substrate;
    wherein said first photonic device is optically coupled to said connector mounting groove through an optical waveguide; and
    wherein said third photonic device is connected to an external component or device outside said substrate through an optical waveguide.

11. The optoelectronic integrated circuit device as claimed in claim 10, wherein:
    said first and second photonic devices are optically coupled by a first optical waveguide;
    said third and fourth photonic devices are optically coupled by a second optical waveguide; and
    said first and second optical waveguides are formed on the same layer within said substrate so as to extend in directions intersecting each other.

12. The optoelectronic integrated circuit device as claimed in claim 10, wherein:
    said first and second photonic devices are optically coupled by a first optical waveguide;
    said third and fourth photonic devices are optically coupled by a second optical waveguide; and
    said first and second optical waveguides are formed on different layers within said substrate so as to extend in directions intersecting each other.

13. The optoelectronic integrated circuit device as claimed in claim 10, wherein:
    said first and third photonic devices are optically coupled by a first optical waveguide;
    said second and fourth photonic devices are optically coupled by a second optical waveguide; and said first and second optical waveguides are formed on the same layer within said substrate so as to extend in the same direction.

14. The optoelectronic integrated circuit device as claimed in claim 10, wherein said substrate is provided with a ball grid array or a pin grid array for electrical connections to a board.

15. The optoelectronic integrated circuit device as claimed in claim 10, wherein said substrate is provided with a ball grid array or a pin grid array for electrical connection to a board.

16. A communications device comprising:

boards; and an optoelectronic integrated circuit device comprising: a substrate having four sides; an LSI package mounted on said substrate; a first photonic device electrically connected to an I/O terminal disposed on one side of said LSI package; a second photonic device electrically connected to an I/O terminal disposed on an opposite side of said LSI package; a third photonic device electrically connected to an I/O terminal disposed on a side of said LSI package adjacent to said one side; a fourth photonic device electrically connected to an I/O terminal disposed on a side of said LSI package opposite to said adjacent side; and a first connector mounting groove and a third connector mounting groove optically coupled to said first and third photonic devices, respectively, through optical waveguides; wherein said first and third connector mounting grooves are disposed along one side of said substrate;

wherein high frequency signal wiring between said boards are configured with optical interconnection paths using said optoelectronic integrated circuit device.

17. A communications device comprising:

boards; and an optoelectronic integrated circuit device comprising: a substrate having four sides: an LSI package mounted on said substrate; a first photonic device electrically connected to an I/O terminal disposed on one side of said LSI package; a second photonic device electrically connected to an I/O terminal disposed on an opposite side of said LSI package; a third photonic device electrically connected to an I/O terminal disposed on a side of said LSI package adjacent to said one side; a fourth photonic device electrically connected to an I/O terminal disposed on a side of said LSI package opposite to said adjacent side; and a connector mounting groove for mounting a connector to which an optical fiber is connected, said optical fiber being connected at the other end to an external component or device outside said substrate; wherein said first photonic device is optically coupled to said connector mounting groove through an optical waveguide; and wherein said third photonic device is connected to an external component or device outside said substrate through an optical waveguide;

wherein high frequency signal wiring between said boards are configured with optical interconnection paths using said optoelectronic integrated circuit device.

* * * * *